(12) United States Patent
Kawaguchi et al.

(10) Patent No.: US 10,121,260 B2
(45) Date of Patent: Nov. 6, 2018

(54) ORIENTATION ESTIMATION METHOD AND ORIENTATION ESTIMATION DEVICE

(71) Applicant: PANASONIC INTELLECTUAL PROPERTY MANAGEMENT CO., LTD., Osaka (JP)

(72) Inventors: Kyoko Kawaguchi, Tokyo (JP); Taiki Sekii, Ishikawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/329,031

(22) PCT Filed: Oct. 23, 2015

(86) PCT No.: PCT/JP2015/005332
§ 371 (c)(1),
(2) Date: Jan. 25, 2017

(87) PCT Pub. No.: WO2016/067573
PCT Pub. Date: May 6, 2016

(65) Prior Publication Data
US 2017/0228888 A1    Aug. 10, 2017

(30) Foreign Application Priority Data
Oct. 30, 2014 (JP) ................................ 2014-221072

(51) Int. Cl.
| G06K 9/00 | (2006.01) |
| G06T 7/73 | (2017.01) |
| G06T 7/90 | (2017.01) |
| G06K 9/46 | (2006.01) |
| G06K 9/62 | (2006.01) |
| G06T 7/70 | (2017.01) |

(52) U.S. Cl.
CPC ............ G06T 7/73 (2017.01); G06K 9/00369 (2013.01); G06K 9/4642 (2013.01);
(Continued)

(58) Field of Classification Search
CPC .... G06T 7/00; G06T 7/70; G06T 7/73; G06T 7/80; G06T 7/90; G06T 2207/20081;
(Continued)

(56) References Cited

U.S. PATENT DOCUMENTS 7,147,474 B1* 12/2006 Kronholm, Jr. ........ G09B 19/00
434/236
2004/0209684 A1* 10/2004 Hisano .................... A63F 13/10
463/32

(Continued)

OTHER PUBLICATIONS

The Extended European Search Report dated Sep. 12, 2017 for European Patent Application No. 15853912.2.
(Continued)

*Primary Examiner* — Samir Ahmed
(74) *Attorney, Agent, or Firm* — Greenblum & Bernstein, P.L.C.

(57) ABSTRACT

A processor of an orientation estimation device, as an orientation estimation method for estimating an orientation of a player existing in a sport video, receives reference orientation information which is information obtained based on information input by a user and which is information designating a joint position of a specific player existing in the sport video of an estimation target game and estimates an orientation of an estimation target player who is a player other than the specific player existing in a sport video of an estimation target using the reference orientation information.

14 Claims, 10 Drawing Sheets

(52) U.S. Cl.
CPC ............. *G06K 9/6271* (2013.01); *G06T 7/70* (2017.01); *G06T 7/90* (2017.01); *G06T 2207/10016* (2013.01); *G06T 2207/10024* (2013.01); *G06T 2207/20081* (2013.01); *G06T 2207/30196* (2013.01); *G06T 2207/30204* (2013.01); *G06T 2207/30221* (2013.01)

(58) Field of Classification Search
CPC . G06T 2207/30221; G06T 2207/10016; G06T 2207/30198; G06T 2207/30204; G06K 9/00; G06K 9/2063; G06K 9/3216; G06K 9/3275
USPC .................................. 382/103; 348/169–172
See application file for complete search history.

(56) References Cited

U.S. PATENT DOCUMENTS

2010/0026801 A1    2/2010    Williams et al.

2013/0301882 A1    11/2013    Kawaguchi et al.

OTHER PUBLICATIONS

Dantone Matthias et al: "Human Pose Estimation Using Body Parts Dependent Joint Regressors", IEEE Computer Society Conference on Computer Vision and Pattern Recognition. Proceedings, IEEE Computer Society, US, Jun. 23, 2013 (Jun. 23, 2013), pp. 3041-3048, XP032492872.

Jamie Shotton et al: "Real-time human pose recognition in parts from single depth images", Computer Vision and Pattern Recognition (CVPR), 2011 IEEE Conference on, IEEE, Jun. 20, 2011 (Jun. 20, 2011), pp. 1297-1304, P032037818.

Hashimoto et al., "Robust Human Tracking using Statistical Human Shape Model of Appearance Variation", VIEW2011, Dec. 2011, pp. 60-67, along with a partial English translation.

International Search Report (ISR) in International Pat. Appl. No. PCT/JP2015/005332, dated Nov. 24, 2015.

\* cited by examiner

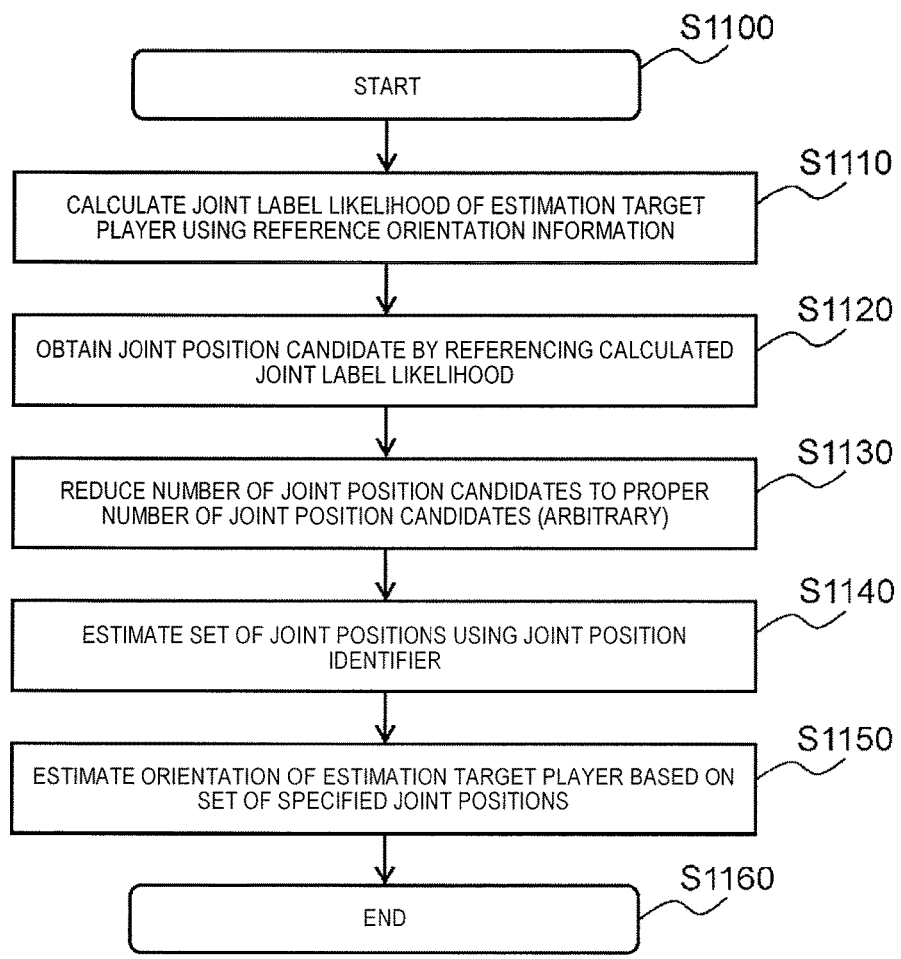

ORIENTATION ESTIMATION METHOD AND ORIENTATION ESTIMATION DEVICE

TECHNICAL FIELD

The present disclosure relates to an orientation estimation method of a player existing in a sport video and an orientation estimation device.

BACKGROUND ART

NPL 1 discloses an orientation estimation method of a player existing in a sport video. The orientation estimation method performs an orientation estimation using backbone part information. With this, it is possible to estimate an orientation of a person with high accuracy.

CITATION LIST

Non Patent Literature

NPL 1: Kiyoshi HASHIMOTO, et al. "Robust Human Tracking using Statistical Human Shape Model of Appearance Variation", VIEW2011, December, 2011, pp. 60-67

SUMMARY OF THE INVENTION

The present disclosure provides an orientation estimation method and an orientation estimation device that efficiently estimate an orientation of a player existing in the sport video.

In the present disclosure, there is a orientation estimation method for estimating an orientation of a player existing in a sport video by a processor, in which the processor of the orientation estimation device receives reference orientation information, which is obtained based on information input by a user and which designates a joint position of a specific player existing in the sport video of an estimation target game, as a way of estimating an orientation of a player existing in the sport video. The processor estimates the orientation of an estimation target player who is other than the specific player existing in a sport video of an estimation target by using the reference orientation information In the present disclosure, the orientation estimation method and orientation estimation device are effective for efficiently estimating the orientation of the player existing in the sport video.

BRIEF DESCRIPTION OF DRAWINGS

FIG. 11 is a flowchart for explaining processing for estimating an orientation of an estimation target player using reference orientation information in another embodiment.

DESCRIPTION OF EMBODIMENTS

In the following, embodiments will be described in detail while appropriately referencing the drawings. But, detailed description more than necessary may be omitted. For example, detailed description of matters already known or a redundant description for substantially the same configuration may be omitted. This is because the following description intends to avoid becoming redundant unnecessarily and make it possible for a person of ordinary skill in the art to understand easy.

The present inventors provide the accompanying drawings and the following descriptions for making it possible for a person of ordinary skill in the art to sufficiently understand the present disclosure and do not intend to limit subject matters set forth in claims.

(Exemplary Embodiment 1)

In the following, exemplary embodiment 1 will be described with reference to FIG. 1 to FIG. 10.

[1-1. Configuration]

Figure 1:
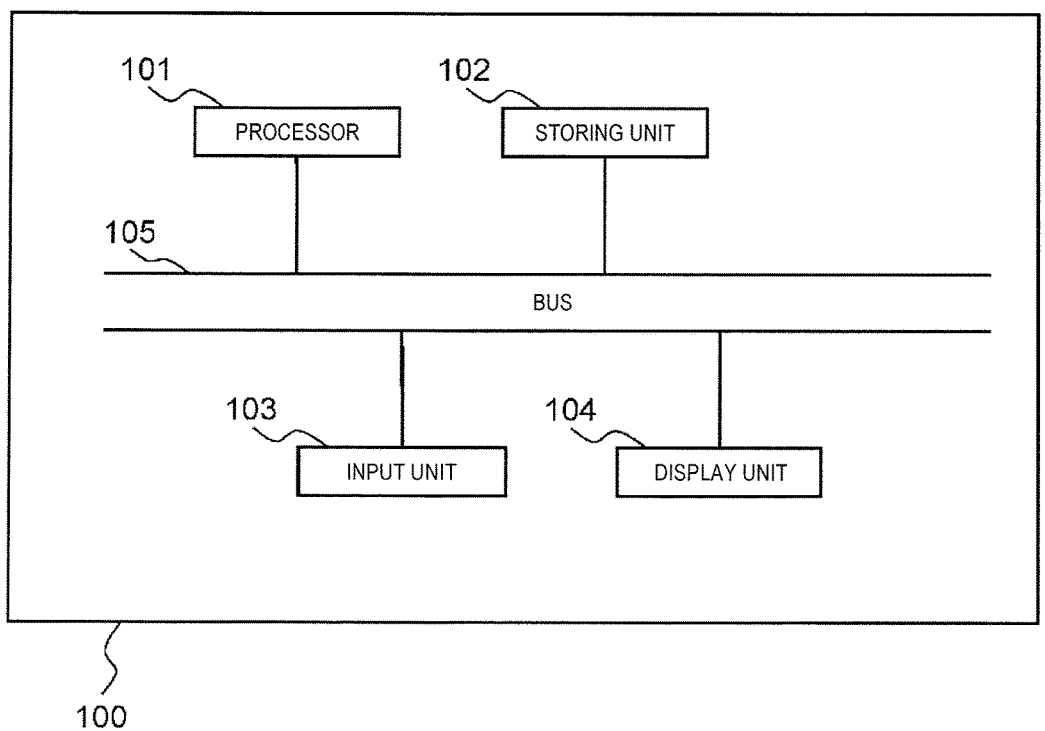
FIG. 1 is a diagram illustrating a configuration of an orientation estimation device in exemplary embodiment 1.

FIG. 1 is a diagram illustrating an example of a configuration of an orientation estimation device of exemplary embodiment 1.

Orientation estimation device 100 includes processor 101, storing unit 102, input unit 103, display unit 104, and bus 105.

Processor 101 controls other constitutional elements by performing operations of an orientation estimation device.

Storing unit 102 stores information temporarily or permanently. Storing unit 102 corresponds to a read only memory (ROM), a random access memory (RAM), or the like, of the orientation estimation device. Orientation estimation device 100 may include a plurality of storing units 102 according to necessity of use or an access speed. It is possible to configure storing unit 102 by applying a hard disk drive (HDD), a synchronous dynamic random access memory (SDRAM), or the like.

Input unit 103 receives a signal from outside. Input unit 103 corresponds to an input device or input interface of orientation estimation device 100. It is possible to configure input unit 103 by applying an input device such as a mouse or a keyboard and an input interface such as a communication port or a wireless communication device.

Display unit 104 displays information on the outside. It is possible to configure display unit 104 by applying a liquid crystal device or the like.

Bus 105 is a path connecting respective elements that constitutes orientation estimation device 100. It is possible to configure bus 105 within processor 101 by integrating bus 105 into processor 101. Bus 105 may connect respective elements in a wired manner and may also connect respective elements wirelessly.

The configuration of orientation estimation device 100 described above is an example. Orientation estimation device 100 may be configured by adding separate constitutional elements to the configuration described above. Orientation estimation device 100 may also be configured by deleting some of the constitutional elements described above as necessary. Orientation estimation device 100 may also be configured by integrating the constitutional elements described above with each other. Orientation estimation device 100 may also be configured by some of the constitutional elements described above.

[1-2. Operation]

Operations of orientation estimation device 100 described above will be described. Orientation estimation device 100 operates in such a way that processor 101 primarily cooperates with respective elements of orientation estimation device 100.

Orientation estimation device 100 estimates an orientation of an estimation target player existing in a sport video input from input unit 103. Orientation estimation device 100 estimates an orientation of a player in order described in the following.

[1-2-2. Previous Learning]

Orientation estimation device 100 performs machine learning in advance before estimating the orientation of a player. In machine learning, a device generates a determination (identification) rule from large amounts of input data with an attribute according to predetermined algorithm by inputting the data to the device. The device can determine which attribute newly given data has by using the generated determination rule.

Orientation estimation device 100 performs two kinds of machine learning. Two kinds of machine learning are machine learning for which orientation estimation device 100 behaves as a joint label identifier and machine learning for which orientation estimation device 100 behaves as a joint likelihood, distribution identifier. An object and a scheme of determination are different between the two kinds of machine learning.

[1-2-2-1. Learning of Joint Label Identifier]

Description will be made on machine learning for which orientation estimation device 100 behaves as a joint label identifier with reference to FIG. 2. The object of the joint label identifier is to output matters that a single point exists in the periphery of which place among joints of the human body when the single point within an image and reference image information (which will be described later) are received as an input.

Figure 2:
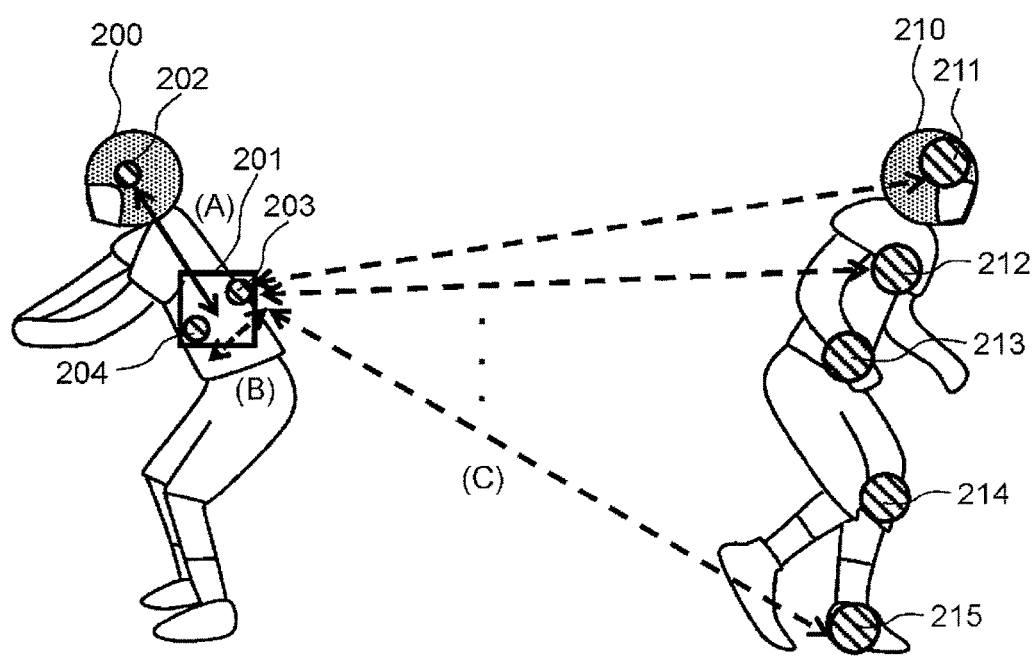
FIG. 2 is a diagram for explaining a concept of learning of a joint label identifier in exemplary embodiment 1.

FIG. 2 is a diagram for explaining a concept of learning of a joint label identifier in exemplary embodiment 1.

Learning player image 200 is an image of a player obtained from a video during the game of the American football. Orientation estimation device 100 can obtain learning player image 200 by acquiring a single frame from the video during the game of the American football. Orientation estimation device 100 can obtain learning player image 200 by acquiring a photograph during the game of the American football.

Orientation estimation device 100 reads large amounts of learning player image 200 of which respective orientations are different. Orientation estimation device 100 can read learning player image 200 by recording learning player image 200 in storing unit 102.

Orientation estimation device 100 performs joint label learning from read learning player image 200. Orientation estimation device 100 performs the joint label learning by applying two elements of (1) "Does an arbitrary single point within learning player image 200 exist in the periphery of which joint among joints of the human body?" and (2) "How many feature amounts does an arbitrary single point among learning player images 200 have?" according to a predetermined algorithm.

Orientation estimation device 100 acquires the element of (1) "Does a single point within learning player image 200 exist in the periphery of which joint among joints of the human body?" Each point of learning player image 200 has information about where does the point itself exist in the periphery of which joint among joints of the human body. In the present embodiment, kinds of joints are five kinds of a head, a chest, a waist, a part above the knee, and a part below the knee. Orientation estimation device 100 acquires the element of (1) "Does an arbitrary single point within learning player image 200 exist in the periphery of which joint among joints of the human body?" by referencing information about kinds of joints maintained by learning player image 200.

Orientation estimation device 100 performs calculation about (2) "How many feature amounts does an arbitrary single point among learning player image 200 have?" by using a concept called a patch. The patch is a rectangular region defined centered on the single point for an arbitrary single point among learning player images 200.

Description will be made on the calculation of the feature amount by referencing patch 201 illustrated in FIG. 2. Orientation estimation device 100 calculates three kinds of feature amounts of (A) "a distance from the head to the central portion of the patch", (B) "a feature amount calculated based on two points within the patch", (C) "an angle between RGB color vectors of a single point within the patch and reference orientation information.

Processor 101 of orientation estimation device 100 obtains (A) "a distance from the head to the central portion of the patch" by calculating a distance from head 202 to the center of patch 201 as illustrated in FIG. 2. The distance from the head to the center of the patch is assumed as having a two-dimensional coordinate format of (x, y). Processor 101 performs calculation of the distance by using the coordinate of head 202 which is defined in advance in learning player image 200. Processor 101 records (A) "a distance from the head to the central portion of the patch" obtained as described above in storing unit 102.

Processor 101 of orientation estimation device 100 obtains (B) "the feature amount calculated based on two points within the patch" by calculating the feature amount based on point 203 and point 204 of patch 201 as illustrated in FIG. 2. Point 203 and point 204 are a pair of random two pixels defined within patch 201. Processor 101 calculates three kinds of feature amounts based on point 203 and point 204. Three kinds of feature amounts are three kinds of (I) "a luminance value", (II) "angles of RGB color vectors", (III) "a difference value between histogram of oriented gradients (HOG) feature amount".

Processor 101 calculates (I) "luminance values" of point 203 and point 204. Each pixel of learning player image 200 maintains a defined luminance value. Processor 101 calculates luminance values of point 203 and point 204 by referencing learning player image 200.

Processor 101 calculates (II) "angles of RGB color vectors" of point 203 and point 204. The RGB color vectors are vectors defined in three-dimensional space having red (R), green (G), and blue (B) as axes. Each pixel of learning player image 200 maintains a defined RGB value. Two RGB color vectors can be obtained by plotting the RGB values of point 203 and point 204 on the three-dimensional space having R, G, and B as axes. Processor 101 can calculate (II) "angles of RGB color vectors" of point 203 and point 204 by calculating the angle of two RGB color vectors.

Processor 101 calculates (III) "the difference value between the HOG feature amounts" regarding point 203 and point 204. The HOG feature amount is represented by a histogram of luminance gradient in the neighborhoods of a point within an image. In the present embodiment, processor 101 defines nine cells by dividing the neighborhood of each point into 3×3. Processor 101 obtains the HOG feature amounts in point 203 and point 204 by representing luminance gradient in a histogram in the defined nine cells. Processor 101 obtains the difference value between the HOG feature amounts by performing subtraction between histograms in the HOG feature amounts of point 203 and point 204. By doing this, processor 101 can calculate (III) "the difference value between HOG feature amounts" regarding point 203 and point 204.

Processor 101 stores (I) "a luminance value", (II) "angles of RGB color vectors", and (III) "a difference value between the HOG feature amounts" in storing unit 102 as feature amounts calculated based on (B) "two points within the patch".

Processor 101 of orientation estimation device 100 calculates the (C) "an angle between RGB color vectors of a single point within the patch and the reference orientation".

Reference orientation for learning 210 is an image of an image of a player which is defined in advance obtained from the video during the game of American football. Orientation estimation device 100 can obtain reference orientation for learning 210 by acquiring a single frame from the video during the game of American football. Orientation estimation device 100 can obtain reference orientation for learning 210 by acquiring a photograph during the game of American football. Reference orientation for learning 210 functions as a reference (standard) for learning player image 200. It is desirable that the player of reference orientation for learning 210 is a player existing in an environment similar to the player of learning player image 200. Specifically, it is desirable that the player of reference orientation for learning 210 is a player who is obtained from the video of the same game and belongs to the same team as the player of learning player image 200.

Each point of reference orientation for learning 210 has information about where does the point itself exist in the periphery of which joint among joints of the human body the point itself exists. In the present embodiment, kinds of joints are five kinds of a head, a chest, a waist, a part above the knee, and a part below the knee.

Processor 101 calculates the angle of RGB color vectors between point 203 or point 204 within patch 201 of learning player image 200 and reference orientation information for learning 211 to reference orientation information for learning 215 which are respective points in the neighborhood of the respective joints of reference orientation for learning 210. The RGB color vectors are similar to that described when the angle of RGB color vectors of point 203 and point 204 is calculated. Reference orientation information for learning 211, reference orientation information for learning 212, reference orientation information for learning 213, reference orientation information for learning 214, and reference orientation information for learning 215 are points that respectively exist in the periphery of a head, a chest, a waist, a part above the knee, and a part below the knee. Processor 101 can obtain reference orientation information for learning 211 to reference orientation information for learning 215 by selecting reference orientation information for learning 211 to reference orientation information for learning 215 in a random manner within the neighborhood of respective joints. Processor 101 calculates angles of RGB color vectors between point 203 or point 204 within patch 201 of learning player image 200 and reference orientation information for learning 211 to reference orientation information for learning 215 in the neighborhood of respective joints of reference orientation for learning 210 by using reference orientation information for learning 211 to reference orientation information for learning 215 obtained as described above. Processor 101 records (C) "the angle of RGB color vectors between a single point within the patch and the reference orientation" obtained as described above in storing unit 102.

Processor 101 records feature amounts of respective points in storing unit 102 by repeating processing described above for respective points (respective patches) of each learning player image 200. By doing this, elements of (1) "Does an arbitrary single point within learning player image 200 exist in the periphery of which joint among joints of the human body?" and (2) "How many feature amounts does an arbitrary single point among learning player image 200 have?" are recorded in storing unit 102. A pair of these elements is called correct answer data.

Processor 101 records feature amounts of respective points in storing unit 102 by repeating the processing described above for respective points of the ground in the neighborhood of learning player image 200 other than each learning player image 200. By doing this, elements of (1) "an arbitrary point not included in learning player image 200 ", and (2) "How many feature amounts does the arbitrary single point have? " are recorded in storing unit 102. A pair of these elements is called incorrect answer data.

Processor 101 of orientation estimation device 100 can determine whether an unknown point on a sport image exists in the periphery of which joint among joints of the human body by applying correct answer data and incorrect answer data recorded by doing this to predetermined algorithm. Specifically, when it is recognized that an unknown point on a sport image has a predetermined feature amount in a relationship with the reference image information, processor 101 can determine where does the point exist in the periphery of which joint among joints (head, chest, waist, part above knee, and part below knee) or whether the point belongs to a part (ground or the like) other than joints. This is because processor 101 learns that a point existing in the periphery of which joint among joints of the human body has what kind of feature amount in a relationship with reference image information and further learns that an arbitrary single point which is not included in learning player image 200 has what kind of feature amount in a relationship with reference image information. An output of a result determined by doing this is called a joint label. By doing this, processor 101 of orientation estimation device 100 can behave as a joint label identifier. When an unknown point on the image and reference image information are given, processor 101 can output the joint label by behaving as the joint label identifier.

Processor 101 performs discrimination by adopting, for example, algorithm which uses a decision tree as predetermined algorithm. In particular, as described in the present embodiment, algorithm which prepares a decision tree using the element randomly selected is called a Random-forest method. As described in the present embodiment, a concept that performs learning using correct answer data and incorrect answer data for data discrimination is called machine learning.

In the present embodiment, the joint label identifier is configured by using the Random-forest method. However, specific algorithm to be applied to orientation estimation device 100 is not limited to the Random-forest method. For example, specific algorithm to be applied to orientation estimation device 100 can be selected from known algorithm used in machine learning. Orientation estimation device 100 does not need to actually perform machine learning. Processor 101 of orientation estimation device 100 can behave as the joint label identifier by using a discrimination equation obtained when other devices perform machine learning.

[1-2-2-2. Learning of Joint Likelihood Distribution Identifier]

Description will be made on machine learning in order for orientation estimation device 100 to behave as a joint likelihood distribution identifier. An object of the joint likelihood distribution identifier is to output likelihood that an image with a joint label is a correct answer when a single point within the image with the joint label and reference orientation information are received as an input.

Processor 101 behaves as the joint likelihood distribution identifier by performing machine learning using the feature amount described in learning of the joint label identifier. Although processor 101 performs machine learning using Random-forest method in the learning of the joint label identifier, processor 101 performs machine learning by using Regression-forest method in learning of the joint likelihood distribution identifier. The Regression-forest method is algorithm obtained by adapting the Random-forest method. The Regression-forest method is different from the Random-forest method in that the Regression-forest method can output likelihood. Specifically, the Regression-forest method can be utilized by performing learning using data which is 1 when a part is a specific joint label and otherwise, which is 0 when a part is other than a specific joint label in the Random-forest method. Processor 101 which performs machine learning by the Regression-forest method can output likelihood ranging from 0 to 1 with respect to a single point of the image with the joint label (likelihood indicating certainty that the joint label is correct answer becomes higher as likelihood becomes close to 1).

In the present embodiment, joint likelihood distribution identifier is configured by using the Regression-forest method. However, specific algorithm to be applied to orientation estimation device 100 is not limited to the Regression-forest method. For example, specific algorithm to be applied to orientation estimation device 100 can be selected from known algorithms used in machine learning. Orientation estimation device 100 does not need to actually perform machine learning. Processor 101 of orientation estimation device 100 can behave as the joint likelihood distribution identifier by using likelihood output algorithm obtained when other devices perform machine learning.

[1-2-3. Outline of Operations]

Figure 3:
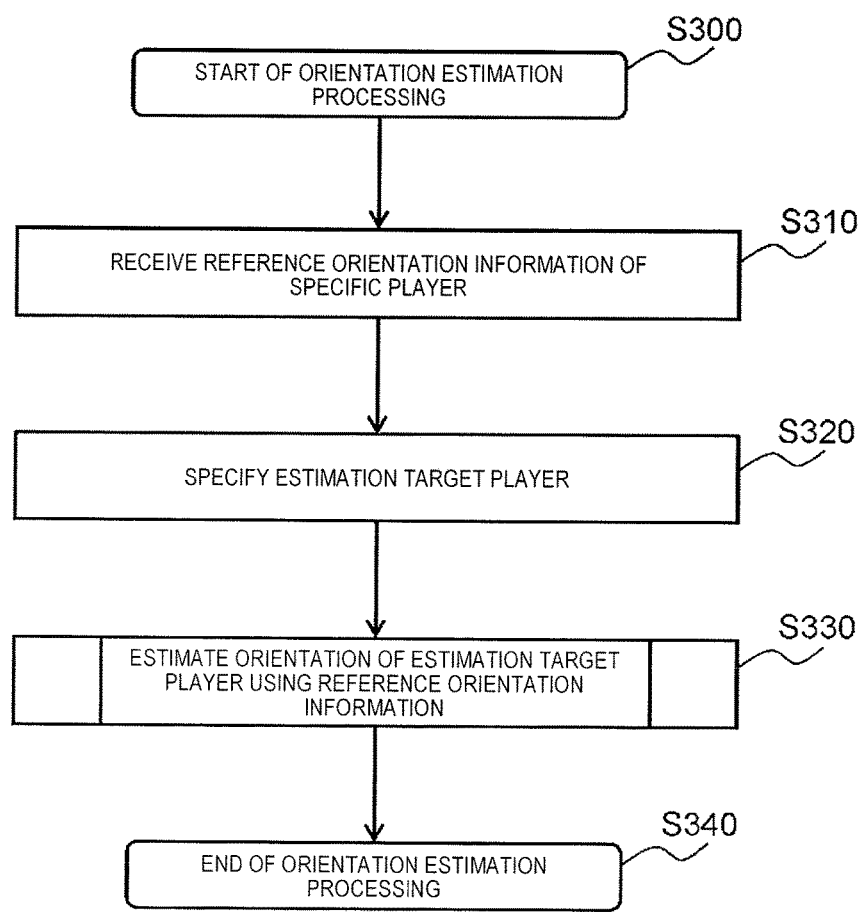
FIG. 3 is a flowchart for explaining orientation estimation processing in exemplary embodiment 1.

FIG. 3 is a flowchart for explaining orientation estimation processing in exemplary embodiment 1. Description will be made on orientation estimation processing performed by orientation estimation device 100 including processor 101 which behaves as the joint label identifier and joint likelihood distribution identifier by using FIG. 3.

Processor 101 starts orientation estimation processing (Step S300). Processor 101 starts orientation estimation processing by executing a specific application. When the orientation estimation processing is started, processor 101 displays a single frame among videos for orientation estimation on display unit 104. The video for orientation estimation is a video during the game of the American football. Processor 101 may receive a video for orientation estimation through an input unit to display the video on display unit 104 and may also read the video for orientation estimation recorded in storing unit 102 to display the video on display unit 104.

Processor 101 receives reference orientation information of a specific player (Step S310). The specific player is a player within the frame displayed in Step S300. Although it is desirable that at least one person is specified for each team as a specific player, a single person of players belonging to which team may be specified. In the present embodiment, reference orientation information is input for a single person of players of two opposing teams. Reference orientation information is information designating a joint position of a specific player. It is possible to define the reference orientation which becomes a reference (standard) of orientation estimation processing by using reference orientation information.

Figure 4:
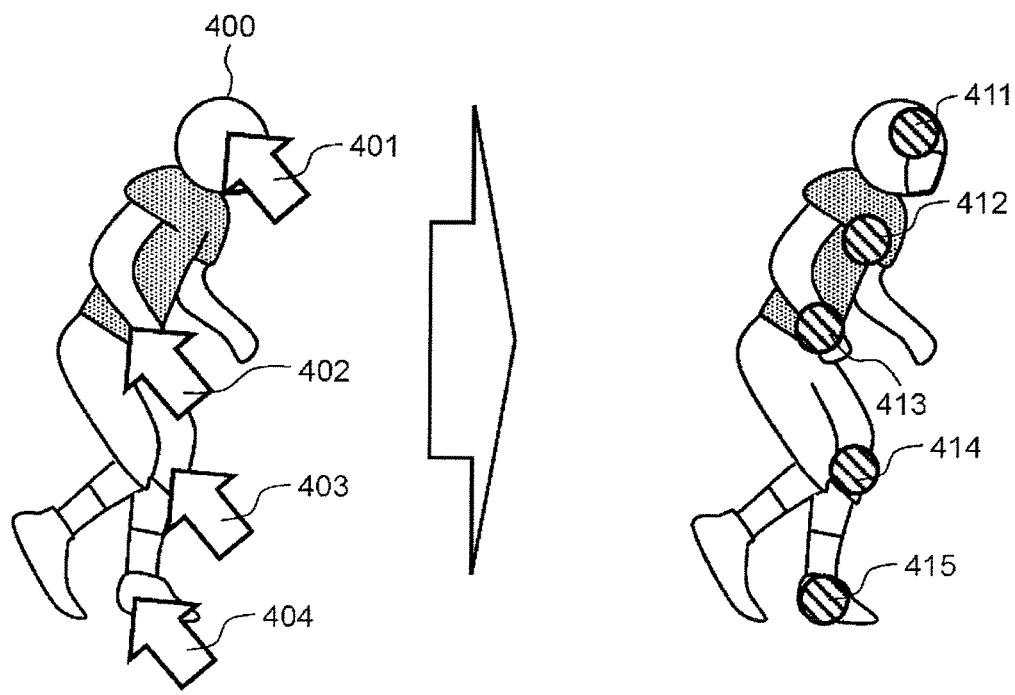
FIG. 4 is a diagram for explaining reference orientation information of a specific player in exemplary embodiment 1.

FIG. 4 is a diagram for explaining reference orientation information of a specific player in exemplary embodiment 1.

Specific player 400 is a player existing in the frame displayed on display unit 104 in Step S300 (For convenience, only the neighborhood of specific player 400 is enlarged within the frame in FIG. 4). Processor 101 receives inputs of point 401 to point 404 from a user of orientation estimation device 100 through input unit 103. The user can perform inputting of point 401 to point 404 using, for example, a mouse or a touch panel as input unit 103. It is desirable that specific player 400 is a player existing in an environment similar to estimation target player 500 which will be described later. Specifically, it is desirable that specific player 400 is a player who is obtained from the video of the same game and belongs to the same team as the player of estimation target player 500.

Point 401 to point 404 are information input by a user of orientation estimation device 100. The user inputs point 401 to point 404 as neighborhood of a specific part in the body of the specific player. Point 401 designates the head of the specific player. Point 402 designates the waist of the specific player. Point 403 designates the part above knee of the specific player. Point 404 designates the part below knee of the specific player.

When point 401 to point 404 are input, processor 101 calculates reference orientation information 411 to reference orientation information 415 based on point 401 to point 404. Processor 101 calculates reference orientation information 411 by calculating the coordinate of point 401. Processor 101 calculates reference orientation information 412 by calculating the coordinate of an intermediate position between point 401 and point 402. Processor 101 calculates reference orientation information 413 by calculating the coordinate of point 402. Processor 101 calculates reference orientation information 414 by calculating the coordinate of point 403. Processor 101 calculates reference orientation information 415 by calculating the coordinate of point 404. Reference orientation information 411 to reference orientation information 415 obtained by doing these are information respectively designating joint positions of the head, the chest, the waist, the part above knee, and the part below knee of the specific player. By doing as described above, processor 101 obtains reference orientation information of the specific player based on the user's input.

When reference orientation information of a specific player is received, processor 101 continues to specify the estimation target player (Step S320). The estimation target player is a player other than a specific target player and is a player within the frame displayed in Step S300.

Figure 5:
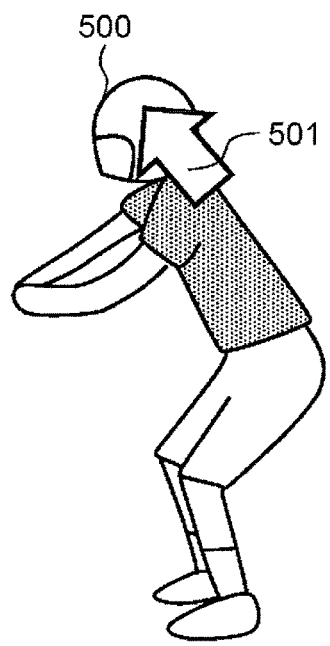
FIG. 5 is a diagram illustrating a concept for specifying an estimation target player in exemplary embodiment 1.

FIG. 5 is a diagram illustrating a concept for specifying an estimation target player in exemplary embodiment 1.

Estimation target player 500 is the player existing within the frame displayed on display unit 104 in Step S300 and a player (only the neighborhood of estimation target player 500 is enlarged within the frame in FIG. 5) other than specific player 400. Processor 101 receives an input of point 501 from the user of orientation estimation device 100 through input unit 103. Specific player 400 and estimation target player 500 are not necessarily to be existed in the same frame.

Point 501 is information input by a user of orientation estimation device 100. Point 501 is, for example, information input from the mouse or touch panel as input unit 103 of orientation estimation device 100. The user inputs point 501 as a point designating the head of estimation target player 500. Processor 101 cuts out the estimation target player from a frame by recognizing point 501 which is information input from the user. Processor 101 performs processing for cutting out the estimation target player from frame by cutting out a rectangular region which uses point 501 as a predetermined position from the frame. Processor 101 divides the rectangular region into areas of a background image and a personal image by performing processing such as edge detection with respect to the rectangular region cut out from the frame. Processor 101 handles the area divided as the personal image as estimation target player 500. When estimation target player 500 and specific player 400 exist in the frame captured with the same angle of view, cutting out of the rectangular region can be preferably performed. This is because, if doing so, processor 101 can estimate a size of estimation target player 500 based on a size of specific player 400. Processor 101 estimates the size of specific player 400 based on pieces of reference orientation information 411 to 415 of specific player 400. Processor 101 can set the rectangular region to a suitable range by determining lengths of the long side and short side of the rectangular region based on the estimated size and thus, it is possible to preferably perform cutting out of the rectangular region.

Point 501 is not limited to information input by a user of orientation estimation device 100. Point 501 may also be specified by allowing processor 101 to autonomously detect a shape of the head or upper body of a human being who exists within the frame. Processor 101 can autonomously detect a shape of the head present within the frame by behaving as a head detector or an upper body detector. Processor 101 can behave as the head detector or the upper body detector by learning a pattern of the head or a pattern of the upper body of a human being using machine learning. In a case where processor 101 detects the shape of the head as the head detector, processor 101 sets an arbitrary point included in the detected head as point 501. In a case where processor 101 detects the shape of the upper body as the upper body detector, processor 101 sets an arbitrary point within the region, which is existing in a relatively upper portion in the upper body, as point 501. In a case where point 501 is input by the user, there is an advantage that reliability of point 501 is higher compared to a case where point 501 is detected by processor 101. In a case where point 501 is detected by processor 101, there is an advantage that a burden of the user is reduced compared to a case where point 501 is input by the user. Processor 101 may also prompt the user to confirm through display unit 104 after autonomously detecting point 501. Processor 101 may receive addition and modification of point 501 by receiving the input of point 501 through input unit 103 after prompting the user to confirm.

When the estimation target player 500 is specified, processor 101 continues to estimate an orientation of an estimation target player using reference orientation information (Step S330). Reference orientation information is reference orientation information 411 to reference orientation information 415 obtained by processor 101 in Step S310. The estimation target player is estimation target player 500 specified in Step S320. As in the present embodiment, in a case where reference orientation information is input regarding the players of each of two opposing teams, it is desirable that a team of the estimation target player matches a team of the specific player based on the reference orientation information. Accordingly, in the present embodiment, orientation of the estimation target player within the team is estimated for each team using input reference orientation information (for simplifying explanation, in the present embodiment, although an example of estimating orientation of only a single team is illustrated, even when the number of teams is increased, processing to be performed by processor 101 is the same except for the specific player and the estimation target player).

Figure 6:
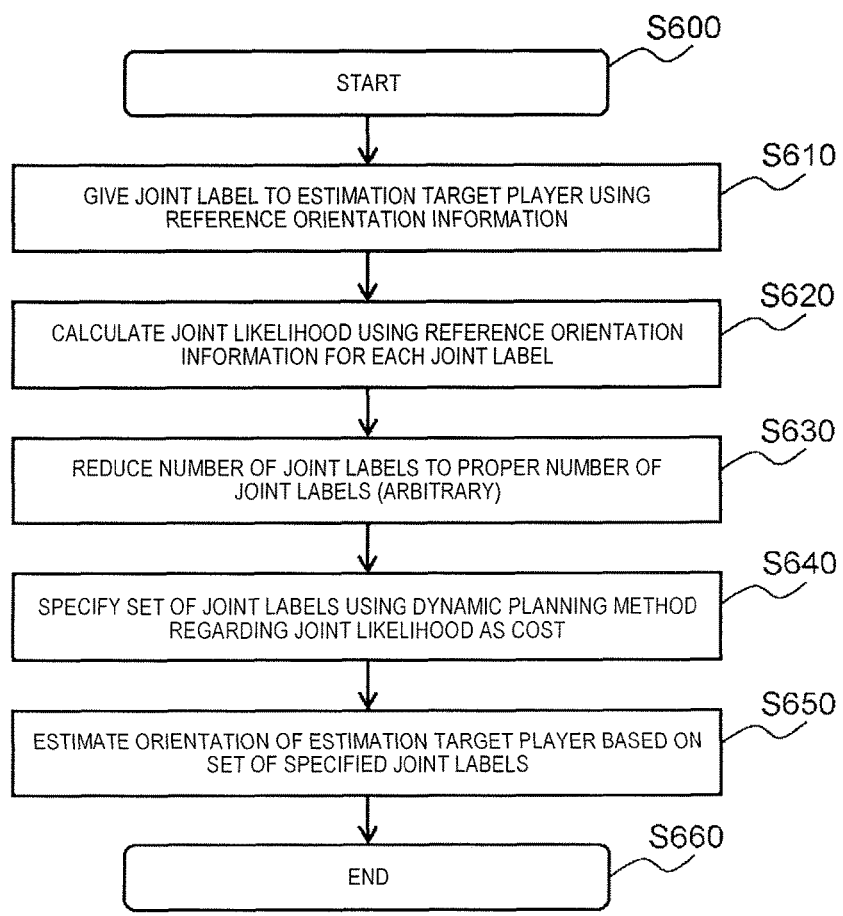
FIG. 6 is a flowchart for explaining processing for estimating an orientation of an estimation target player using reference orientation information in exemplary embodiment 1.

Step S330 will be described in detain using FIG. 6. FIG. 6 is a flowchart for explaining processing for estimating an orientation of an estimation target player using reference orientation information in exemplary embodiment 1.

Processing proceeds to Step S330 such that processor 101 starts processing for estimating an orientation of the estimation target player using reference orientation information (Step S600).

Processor 101 gives a joint label to the estimation target player using reference orientation information (Step S610). Processor 101 can behave as the joint label identifier as described above. Processor 101 as the joint identifier outputs matters about where does a single point exist in the periphery of which joint among joints of the human body when a single point within an image and reference orientation information (which will be described later) are received as an input. Specifically, as described in the section of learning of joint label identifier, processor 101 defines the patch regarding an arbitrary single point of estimation target player 500 and calculates three kinds of (A) "a distance from the head to the central portion of the patch", (B) "a feature amount calculated based on two points within the patch", (C) "an angle between RGB color vectors, as information relating to color, of reference orientation information 411 to reference orientation information 415 and a single point within the patch". For (A) "the distance from the head to the central portion of the patch", the coordinate of point 501 is used as a position of the head differently from description of the section of learning of joint label identifier. Regarding (C) "the angle between RGB color vectors of reference orientation and the single point within the patch", reference orientation of learning data is not used, but reference orientation information obtained in Step S310 is used. Processor 101 gives the joint label for respective points of the estimation target player based on the feature amount obtained by doing as described above.

Figure 7:
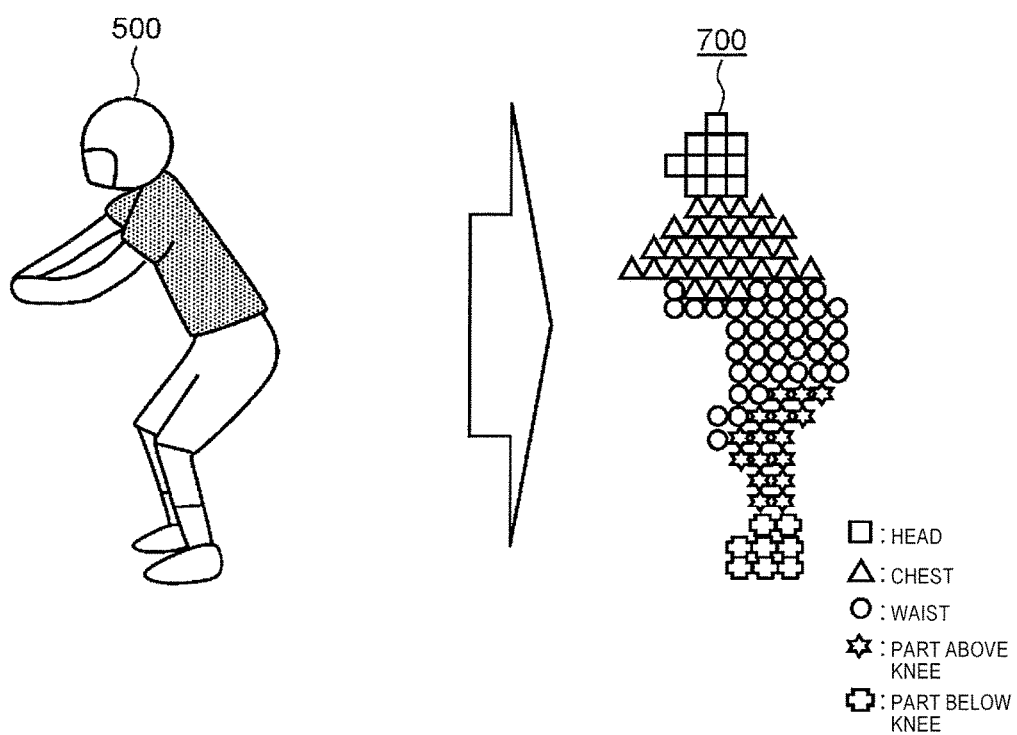
FIG. 7 is a diagram representing a concept of giving a joint label to the estimation target player using reference orientation information in exemplary embodiment 1.

FIG. 7 is a diagram representing a concept of giving a joint label to the estimation target player using reference orientation information in exemplary embodiment 1. For simplifying the drawing, FIG. 7 illustrates only joint label 700 which is not given to respective points of the estimation target player, but a representative point. As illustrated in FIG. 7, a square of label is given to a place determined as the head by the joint label identifier. In addition, labels are also similarly given to the chest (triangle), the waist (circle), the part above knee (star), and the part below knee (cross). The joint label may be only a conceptual label and processor 101 does not need to actually display the joint label on display unit 104. In a case where processor 101 displays the joint label on display unit 104, there is an advantage that the user easily recognizes whether orientation estimation is normally operated or not.

When the joint label is given to the estimation target player, processor 101 continues to calculate the joint likelihood using reference orientation information for each joint label (Step S620). Processor 101 can behave as the joint likelihood distribution identifier as described above. Processor 101 as the joint likelihood distribution identifier outputs the likelihood that an image with a joint label is a correct answer when a single point within the image with the joint label and reference orientation information are received as an input. Specifically, as described in the section of learning of joint likelihood distribution identifier, processor 101 defines the patch regarding an arbitrary single point of estimation target player 500 and calculates three kinds of (A) "a distance from the head to the central portion of the patch", (B) "a feature amount calculated based on two points within the patch", (C) "an angle between RGB color vectors, as information relating to color, of reference orientation information 411 to reference orientation information 415 and a single point within the patch". For (A) "the distance from the head to the central portion of the patch", the coordinate of point 501 is used as a position of the head differently from that described in the section of learning of joint likelihood distribution identifier. Regarding (C) "the angle between RGB color vectors of reference orientation and the single point within the patch", reference orientation of learning data is not used, but reference orientation information obtained in Step S310 is used. Processor 101 outputs the likelihood that the joint labels given to respective points of the estimation target player are the correct answer based on the feature amount obtained as described above.

Figure 8:
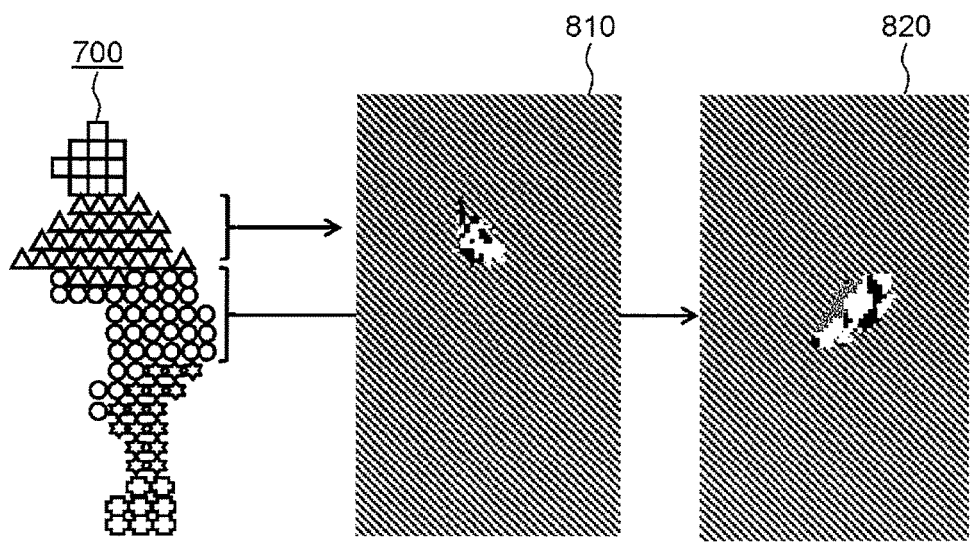
FIG. 8 is a diagram representing a concept of calculating a joint likelihood using reference orientation information in exemplary embodiment 1.

FIG. 8 is a diagram representing a concept of calculating joint likelihood using reference orientation information in exemplary embodiment 1. Joint likelihood distribution 810 is a distribution of likelihoods that a matter to which the joint label of the chest (triangle) is given is the correct answer. Processor 101 as the joint likelihood distribution identifier calculates joint likelihood distribution 810 by calculating the likelihood that a matter to which the joint label of the chest is given is the correct answer for the place to which the joint label of the chest is assigned. Joint likelihood distribution 810 is represented as a gray scale. In joint likelihood distribution 810, a place having high likelihood is represented by a color close to white. In joint likelihood distribution 810, a place having low likelihood is represented by hatching instead of being represented by a color close to black in order to facilitate understanding of the drawing.

Joint likelihood distribution 820 is a distribution of likelihoods that a matter to which the joint label of the waist (circle) is given is the correct answer. In joint likelihood distribution 820, a place having high likelihood is represented by a color close to white. In joint likelihood distribution 820, a place having low likelihood is represented by hatching instead of being represented by a color close to black in order to facilitate understanding of the drawing.

Processor 101 calculates similarly joint likelihood distribution also regarding the head (square), the part above knee (star), and the part below knee (cross). The joint likelihood distribution may be only a conceptual label and processor 101 does not need to actually display the joint likelihood distribution on display unit 104. In a case where processor 101 displays the joint likelihood distribution on display unit 104, there is an advantage that the user easily recognizes whether orientation estimation is normally operated or not.

When the joint likelihood is calculated, processor 101 continues to reduce the number of the joint labels to a proper number of joint labels (Step S630). Processor 101 reduces the number of the joint labels to a proper number of joint labels in order to improve calculation processing and processor 101 may not perform Step S630. Processor 101 reduces the number of joint labels to a proper number of joint labels by using a known clustering method such as the k-Means method for each joint label.

Processor 101 specifies a set of joint labels using a dynamic planning method (Step S640). The dynamic planning method is a generic term of algorithm which solves an optimization problem. In the present embodiment, the optimization problem is to select the surest (optimum) combination from respective joint labels.

Figure 9:
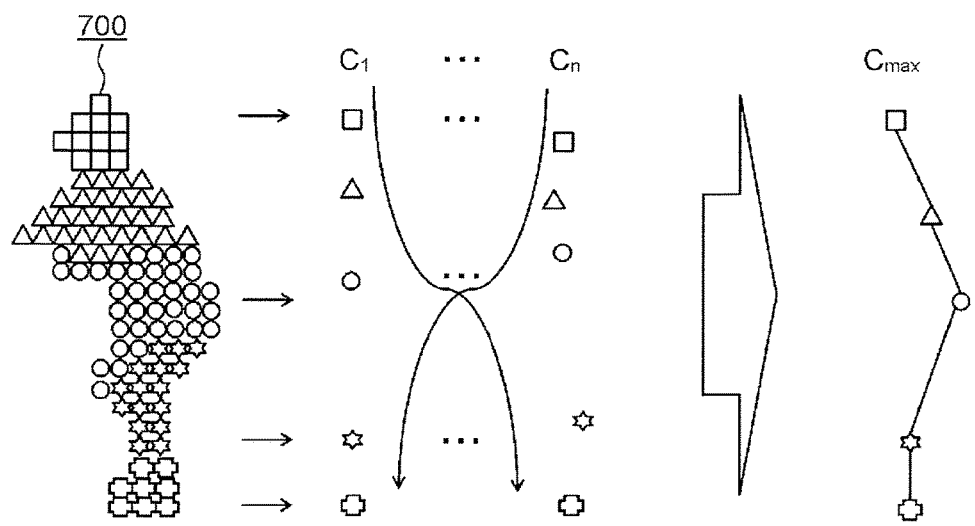
FIG. 9 is a diagram for explaining a concept for specifying a set of joint labels using a dynamic planning method in exemplary embodiment 1.

FIG. 9 is a diagram for explaining a concept for specifying a set of joint labels using a dynamic planning method in exemplary embodiment 1. In the present embodiment, three types of functions called as a cost are defined for each joint label. Processor 101 selects a set of joint labels which maximizes the total sum of the costs using the dynamic planning method. As conceptually illustrated in FIG. 9, when an arbitrary combination is selected from respective joint labels, processor 101 calculates a cost of the combination (C1 . . . Cn).

In the present embodiment, processor 101 defines three kinds of likelihoods of (Ca) a joint likelihood, (Cb) an inter-joint distance likelihood, and (Cc) an inter-joint angle likelihood as a cost.

The joint likelihood (Ca) is a likelihood defined for each joint label calculated in Step S620. In a case where an arbitrary joint label (called joint label candidate) is selected as a candidate of combinations of a set of joint labels, processor 101 allocates the likelihood of the joint label as the cost. In a case where the number of the joint labels is reduced in Step S630, processor 101 allocates the total of likelihoods of joint labels (including the joint label reduced in Step S630 ) in the neighborhood of the joint label candidate as the cost. A possibility that processor 101 estimates the combination of a set of joint labels, of which certainty as a part is low, as the orientation is reduced by doing as described above.

The inter-joint distance likelihood (Cb) is a likelihood of a distance between joint label candidates. Processor 101 can obtain the likelihood of the distance between the joint label candidates by using the inter-joint distance in learning data of previous learning. Specifically, processor 101 is able to handle the inter-joint distance as a predetermined distribution by obtaining an average or variance of the inter-joint distances in learning data to thereby make it possible to output the likelihood when the distance between joint label candidates is given. Processor 101 allocates the cost of a set of joint labels by adding the likelihood of the distance between the joint label candidates for each pair of the joint label candidates. By doing as described above, a possibility that processor 101 estimates a combination of joint labels, of which length is abnormally long or short in terms of an inter-joint length of a human body, as the orientation is reduced.

The inter-joint angle likelihood (Cc) is a likelihood of an angle between the joint label candidates. Processor 101 can obtain the likelihood of the angle between the joint label candidates by using the inter-joint distance in learning data of previous learning. Specifically, processor 101 is able to handle the inter-joint distance as a predetermined distribution by obtaining an average or variance of the inter-joint angles in learning data to thereby make it possible to output the likelihood when the angle between joint label candidates is given. Processor 101 allocates the cost of a set of joint labels by adding the likelihood of the angle between the joint label candidates for each pair of the joint label candidates. By doing as described above, a possibility that processor 101 estimates a combination of joint labels which is curved in an abnormal direction in terms of an inter-joint angle of a human body as the orientation is reduced. The inter-joint angle of a human body that plays the sport frequently differs from that of a normal human body. In the present embodiment, processor 101 learns the inter-joint angle specific to a human body that plays sport by using learning data to thereby make it possible to estimate a combination of joint labels, of which angle is abnormal in terms of a normal situation but normal in terms of the sport, as the orientation.

As described above, processor 101, regarding each set of joint labels, specifies a set of joint labels by allocating the total sum of the joint likelihood (Ca), the inter-joint distance likelihood (Cb), and the inter-joint angle likelihood (Cc) as the cost and calculating a combination of joint labels of which the cost is the largest.

When a set of joint labels is specified, processor 101 estimates the orientation of the estimation target player based on a set of specified joint labels (Step S650). In the present disclosure, at least specifying of a pair of parts of the body of a player performed by processor 101 in Step S640 is sufficient for estimation of the orientation of the estimation target player. Accordingly, recording of a set of joint labels specified in Step S640 in storing unit 102 by processor 101 in Step S650 is included in estimating of the orientation of the estimation target player.

When processor 101 estimates the orientation of the estimation target player, the orientation estimation processing is ended (Step S340, Step S660).

In the present embodiment, description will be further made on a method for giving a meaning of the specific orientation to a set of joint labels based on the set of the joint labels specified in Step S640 by processor 101.

Figure 10:
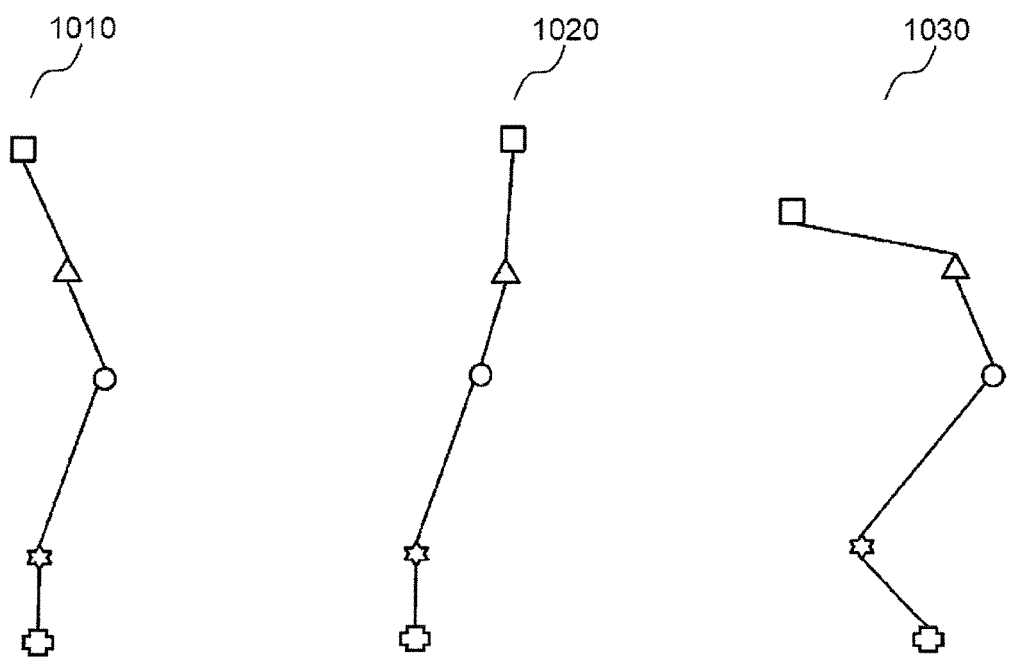
FIG. 10 is a diagram for explaining a concept of giving a meaning to the orientation of an estimation target player based on a set of specified joint labels in exemplary embodiment 1.

FIG. 10 is a diagram for explaining a concept of giving a meaning to the orientation of the estimation target player based on a set of the specified joint labels in exemplary embodiment 1. Processor 101 previously learns a relationship between the inter-joint angle and a meaning of the orientation of the player of learning data to thereby make it possible to output a meaning of the orientation of the estimation target player having the joint label when a set of joint labels are given. The inter-joint angle is an inter-joint angle in the inter-joint angle likelihood (Cc) described above. A meaning of the orientation is a classification of orientation and the classification of orientation includes "crouching", "upstanding", "falling" or the like as the classification capable of being perceived by a human being. As illustrated in FIG. 10, when a set of joint labels 1010 is given, processor 101 outputs a classification of a "posture". When a set of joint labels 1020 is given, processor 101 outputs a classification of a "bowing". When a set of joint labels 1030 is given, processor 101 outputs a classification of a "posture of a line of scrimmage". A meaning of the orientation includes various orientations depending on the sport relating to the sport video without being limited to the matters described above. For example, a meaning of the orientation may include a classification of a "shoot" in a soccer video.

[1-3. Effect or the Like]

As having been described above, in the present embodiment, processor 101 of orientation estimation device 100 performs a method for estimating the orientation of the player existing in the sport video. Processor 101, as a method for estimating the orientation of a player existing in a sport video, receives reference orientation information, which is information obtained based on information input by a user and which is information designating the joint position of a specific player existing in the sport video of an estimation target game and, estimates the orientation of an estimation target player, who is a player other than the specific player, existing in a sport video of an estimation target by using the reference orientation information.

With this, it is possible to estimate the orientation of the estimation target player other than the specific player using information of the specific player within the sport video. For that reason, it is possible to efficiently estimate the orientation of the player existing in the sport video.

In the present embodiment, processor 101 estimates the orientation of the player other than the specific player using information about a color of the estimation target player existing in a sport video of the estimation target game and information about a color of the joint position of the specific player, by using reference orientation information.

With this, it is possible to estimate the orientation of the estimation target player other than the specific player depending on the information about the color of the specific player within the sport video. In general, the player wears uniforms in accordance with the rule in the sport video and thus, pieces of information about a color of a certain player and other players often are similar and the degrees of the reflection of light due to shapes of uniforms of the others players are also often similar. For that reason, it is possible to estimate the orientation of the player existing in the sport video more efficiently.

In the present embodiment, a sport is a team competition sport and reference orientation information is information input for players of each of at least two opposing teams.

With this, it is possible to reduce a possibility that an attribute (degree to which light is impinging due to a shape of team's own uniforms, a color, or a direction of a base) of a team, to which the estimation target player or the specific player belongs, gives the negative bias to a orientation estimation result even when the sport video is relevant to a team competition sport. For that reason, it is possible to more efficiently estimate the orientation of the player existing in the sport video.

In the present embodiment, the sport is a certain sport in which the specific player and the estimation target player wear prescribed uniforms for each team. With this, a possibility that the specific player and the estimation target player wear similar uniforms is high and thus, a possibility that an element for an optical difference between the specific player and the estimation target player is limited to an element of the orientation becomes higher. For that reason, it is possible to more efficiently estimate the orientation of the player existing in the sport video.

In the present embodiment, processor 101 specifies the estimation target player by information input from the user.

With this, processor 101 can definitely specify the estimation target player from within the sport video in which multiple objects are present. For that reason, it is possible to more efficiently estimate the orientation of the player existing in the sport video.

As in the present embodiment, when the user's input designates a specific part of the estimation target player, information of the specific part can be used in the orientation estimation using reference orientation information and thus, which is more preferable.

Processor 101 may specify the estimation target player without depending on the user's input. For example, the estimation target player may be automatically specified from within the sport video based on the feature amount that the player of the sport video has.

In the present embodiment, processor 101 uses reference orientation information input for each team to estimate the orientation of the estimation target player within the team.

With this, it is possible to increase a possibility that an attribute (degree to which light is impinging due to shape of team's own uniforms, color, or direction of a base) of a team to which the estimation target player or the specific player belongs gives the positive bias to an orientation estimation result even when the sport video is relevant to a team competition sport. For that reason, it is possible to more efficiently estimate the orientation of the player existing in the sport video.

In the present embodiment, information designating the joint position of the specific player is generated based on the user's input individually performed for at least a plurality of places of joints and information specifying the estimation target player is generated based on the user's input individually performed for the number of places fewer than the number of the plurality of places of joints. In the present disclosure, the number of specific players becomes small and the estimation players are players other than the specific players and thus become a majority. Accordingly, when doing as described above, although a relatively large number of inputs are needed for the small number of players, orientation estimation can be performed for the large number of players using a relatively small number of inputs. For that reason, the total number of input times performed by the user becomes relatively small number of input. Accordingly, it is possible to more efficiently estimate the orientation of the player existing in the sport video.

Another Exemplary Embodiment

As having been described above, exemplary embodiment 1 is described as an illustrative example of technology disclosed in the present application. However, in the present disclosure, the technology is not limited to exemplary embodiment 1 and may be applied to an embodiment which is embodied by being subjected to suitable changes, substitutions, additions, omissions and the like. Respective constitutional elements described in exemplary embodiment 1 are combined to thereby make it possible to constitute a new embodiment.

In the following, another embodiment will be described as an illustrative example.

In exemplary embodiment 1, in Step S330, processor 101 estimates the orientation of the estimation target player using the joint label identifier and joint likelihood distribution identifier as illustrated in FIG. 6. Another example of processing for estimating the orientation of the estimation target player will be described using FIG. 11.

FIG. 11 is a flowchart for explaining processing for estimating an orientation of an estimation target player using reference orientation information in another embodiment.

The processing proceeds to Step S330 such that processor 101 starts the processing for estimating the orientation of the estimation target player using reference orientation information (Step S1100).

Processor 101 calculates joint label likelihood of the estimation target player using reference orientation information (Step S1110). The joint label likelihood is the likelihood defined for a certain single point on an image and indicates certainty that the single point is an arbitrary joint label. In exemplary embodiment 1, processor 101 gives the joint label to respective points on the image and outputs the likelihood corresponding to the given joint label. In the present embodiment, processor 101, for an arbitrary single point, outputs the likelihood that the arbitrary single point belongs to each of candidates (head, chest, waist, part above knee, and part below knee) of the joint label as the joint label likelihood. Processor 101 can output the joint label likelihood by using a joint likelihood distribution identifier. In the present embodiment, processor 101 can calculate the joint label likelihood by giving the single point on an image to which each of candidates of the joint label is given as the joint label likelihood and reference orientation information to the joint distribution identifier as an input. In an example of a specific output, processor 101 calculates, for a single point of estimation target player 500, the joint label likelihood having a format of (0.8 (joint label=head likelihood), 0.1 (joint label=chest likelihood), 0.05 (joint label =waist likelihood), 0.01 (joint label=part above knee likelihood), and 0.04 (joint label=part below knee likelihood)).

Processor 101 obtains joint position candidates by referencing the calculated joint label likelihood (Step S1120). The joint position candidates are a pair of a joint label defined for an arbitrary single point on an image and the likelihood and pairs of top two joint label candidates having high likelihood among the joint label likelihoods given in Step S1110 and likelihoods corresponding to the top two joint label candidates. In other words, the joint position candidates can be two joint labels existing in the same position. In the example described above, 0.8 (joint label=head likelihood) and 0.1 (joint label=chest likelihood) are the joint position candidates. In the present embodiment, the number of the joint labels becomes twice compared to exemplary embodiment 1 by obtaining the joint position candidate based on the joint label likelihood. Processor 101 can reduce the risk of erroneous estimation in a case where an erroneous joint label is given, compared to exemplary embodiment 1 by increasing the number of the joint labels to be given. In exemplary embodiment 1, a pixel to which the erroneous joint label is given is a pixel having a feature amount of being probable with respect to a plurality of joint labels. In the present embodiment, processor 101 does not limit the kinds of joint labels to be given to one and thus, a plurality of joint labels are given for the pixel having feature amount of being probable also with respect to the plurality of joint labels. When doing as described above, although a complexity of processing is increased, a mapped joint label (and likelihood) can be used for orientation estimation processing in exemplary embodiment 1.

When the joint position candidate is calculated, processor 101 continues to reduce the number of joint position candidates to a proper number of the joint position candidates (Step S1130). An outline of Step S1130 is described in Step S630 and thus is omitted. In another embodiment, the joint position candidate of which amount is twice compared to the joint label of exemplary embodiment 1 exists. Accordingly, it is desirable that the number of the joint position candidates is reduced to a proper number of joint position candidates. In the present embodiment, it is assumed that the number of the joint position candidates is reduced to k joint position candidates for respective joints (head, chest, waist, part above knee, and part below knee).

Processor 101 estimates a set of the joint positions using a joint position identifier. The joint position identifier is one of identifiers implemented in such a way that processor 101 performing predetermined machine learning behaves. An outline of machine learning is described above and thus, is omitted.

Description will be made on a feature amount used for configuring the joint position identifier. The joint position identifier can be configured in such a way that processor 101 learns the following feature amount V for a large amounts of correct answer data and incorrect answer data.

$$V = \begin{bmatrix} P_{11}, x_{11}, y_{11} & \cdots & P_{1k}, x_{1k}, y_{1k} \\ \vdots & \ddots & \vdots \\ P_{j1}, x_{j1}, y_{j1} & \cdots & P_{jk}, x_{jk}, y_{jk} \end{bmatrix}$$

In the Equation 1, P is a likelihood of an n-th (n=1 to k) joint position candidate to which the joint label of the j kinds of joints (head, chest, waist, part above knee, and part below knee correspond to 1 to j) is given. x and y are the x coordinate and the y coordinate of the n-th (n=1 to k) joint position candidate to which the joint label of the j kinds of joints (head, chest, waist, part above knee, and part below knee correspond to 1 to j) is given. V is 3 (P, x, y) ×j×k dimensional feature amount. Processor 101 can output a likelihood that an unknown image belongs to a specific orientation when the obtained V is given to the unknown image by learning the feature amount V described above regarding a large amounts of correct answer data (image of which orientation being taken becomes evident) and incorrect answer data (random image).

In the present embodiment, processor 101 calculates the V using the joint position candidate obtained in Step S1110. Processor 101 calculates an orientation having high likelihood using the calculated V to thereby estimate the orientation as an orientation of the estimation player.

In exemplary embodiment 1 and another embodiment described above, an RGB vector is described as an example of information about a color. Information about a color may be information about a color regardless of white or RGB. Accordingly, information about a color is not limited to the RGB vector. For example, a hue saturation value (HSV) color space vector may also be used as information about a color.

In exemplary embodiment 1 and another embodiment described above, the American football is described as an example of the sport. Any sport may be available if the sport has a use for an estimation of orientation. However, in a case where the present disclosure is applied to a team competition sport as a sport, as described above, in general, the player wears uniforms in accordance with the rule in the sport video and thus, there is a merit of being able to estimate the orientation of the player existing in the sport video more efficiently. In a case where the present disclosure is applied to a certain sport in which the specific player and the estimation target player wear prescribed uniforms for each team as the sport, as described above, a possibility that an element for an optical difference between the specific player and the estimation target player is limited to an element of the orientation becomes higher, and thus, it is possible to more efficiently estimate the orientation of the player existing in the sport video.

In exemplary embodiment 1 and another embodiment described above, orientation estimation device 100 estimates a final orientation based on the likelihood. Here, in a case where the likelihood of the finally estimated orientation does not meet a predetermined value, orientation estimation device 100 displays matters that estimation accuracy does not meet a predetermined level on display unit 104. When doing as described above, there is an advantage of being able to provide awareness to a user of the orientation estimation device 100 of low estimation accuracy and prompt the user to re-input reference orientation or re-collect data for learning.

As such, the embodiments are described as illustrative examples of the technology of the present disclosure. For that reason, the accompanying drawings and detailed description are provided.

Therefore, among the constitutional elements described in the accompanying drawings and detailed description, the constitutional elements that are not essential for solving technical problems as well as essential constitutional elements for solving technical problems may also be included in order to illustrate the technology. For that reason, it should not be accepted that, the constitutional elements that are not essential are essential on account of that these constitutional elements that are not essential are described in the accompanying drawings and detailed description.

The embodiments described above are intended to illustrate a technology and thus, various changes, substitutions, additions, omissions and the like in the form of the embodiments described herein may be made within the claims and equivalents thereof.

INDUSTRIAL APPLICABILITY

The present disclosure can be applied to a method or a device that estimates an orientation of a player within a sport video. Specifically, the present disclosure can be applied to a computer installed with an application software that handles the sport video.

The invention claimed is:

1. An orientation estimation method for estimating an orientation of a player existing in a sport video by a processor, wherein the processor
receives reference orientation information of a specific player included in the sport video, the reference orientation information designating a plurality of joint positions of the specific player;
applies the reference orientation information to an estimation target player that is included in the sport video and different from the specific player; and estimates an orientation of the estimation target player using the reference orientation,
wherein information designating the joint positions of the specific player is generated based on user's input individually performed for at least a plurality of places of joints, and
wherein information specifying the estimation target player is generated based on the user's input individually performed for a number of places fewer than a number of the plurality of places of joints.

2. The orientation estimation method according to claim 1, wherein the processor further estimates information about a color of the estimation target player, and information about a color of the joint positions positions of the specific player.

3. The orientation estimation method according to claim 1,
wherein a sport of the sport video is a team competition sport, and
the reference orientation information is information input for a player of each of at least two opposing teams.

4. The orientation estimation method according to claim 3,
wherein the processor estimates the orientation of the estimation target player within a team among the at least two opposing teams using the reference orientation information for each team of the at least two opposing teams.

5. The orientation estimation method according to claim 1,
wherein a sport of the sport video is a certain sport in which the specific player and the estimation target player wear prescribed uniforms for each team of the at least two opposing teams.

6. The orientation estimation method according to claim 1,
wherein the processor specifies the estimation target player by information input from the user.

7. An orientation estimation device, comprising: a processor,
wherein the processor receives reference orientation information of a specific player included in the sport video, the reference orientation information designating a plurality of joint positions of the specific player, and
applies the reference orientation information to an estimation target player that is included in the sport video and different from the specific player; and
estimates an orientation of the estimation target player using the reference orientation information,
wherein information designating the joint positions of the specific player is generated based on user's input individually performed for at least a plurality of places of joints, and
wherein information specifying the estimation target player is generated based on the user's input individually performed for a number of places fewer than a number of the plurality of places of joints.

8. The orientation estimation device according to claim 7,
wherein the processor further estimates information about a color of the estimation target player, and information about a color of the joint positions of the specific player.

9. The orientation estimation device according to claim 7,
wherein a sport of the sport video is a team competition sport, and
the reference orientation information is information input for a player of each of at least two opposing teams.

10. The orientation estimation device according to claim 9,
wherein the processor estimates the orientation of the estimation target player within a team among the at least two opposing teams using the reference orientation information for each team of the at least two opposing teams.

11. The orientation estimation device according to claim 7,
wherein a sport of the sport video is a certain sport in which the specific player and the estimation target player wear prescribed team uniforms for each team of the at least two opposing teams.

12. The orientation estimation device according to claim 7,
wherein the processor specifies the estimation target player by information input through the input device from the user.

13. The orientation estimation method according to claim 1,
wherein the joint positions include position includes any of positions of a head, a chest, a waist, a part above knee, and a part below knee of a player.

14. The orientation estimation device according to claim 7,
wherein the joint positions include any of positions of a head, a chest, a waist, a part above knee, and a part below knee of a player.

* * * * *